May 2, 1967   J. D. GARLS ETAL   3,317,878
HIGH SPEED SLIP RING
Filed Dec. 17, 1964

INVENTORS
JAMES D. GARLS
STEVEN J. SCHMIDT
BY CHARLES N. FANGMAN

*Fryer and Zimmold*
ATTORNEYS

United States Patent Office 3,317,878
Patented May 2, 1967

3,317,878
HIGH SPEED SLIP RING
James D. Garls, Pekin, Steven J. Schmidt, Washington, and Charles N. Fangman, Peoria, Ill., assignors to Caterpillar Tractor Co., Peoria, Ill., a corporation of California
Filed Dec. 17, 1964, Ser. No. 419,106
3 Claims. (Cl. 339—5)

This invention relates to slip rings of the kind employed for transmitting electrical signals from sensors on high speed rotating parts to stationary recording equipment.

When strain gauges are used in analysis of mechanical elements rotating at high speed such as turbine rotors, difficulty is encountered with slip rings employed for transmitting electrical signals to a non-rotating circuit. Ordinary mechanical brushes create noise and current fluctuation which make it impossible to record low-magnitude signals with a reasonable degree of fidelity. Known mercury-type rings have been found to become unduly heated and also to form amalgams which interfere with their operation and contaminate the liquid mercury upon which the operation depends.

It is the object of the present invention to provide an improved slip ring for high-speed operation with means to prevent overheating and contamination of the mercury employed as a conductor between rotating and stationary parts.

Further and more specific objects and advantages of the invention and the manner in which it is carried into practice are made apparent in the following specification wherein the invention is described in detail by reference to the accompanying drawing.

Figure 1:
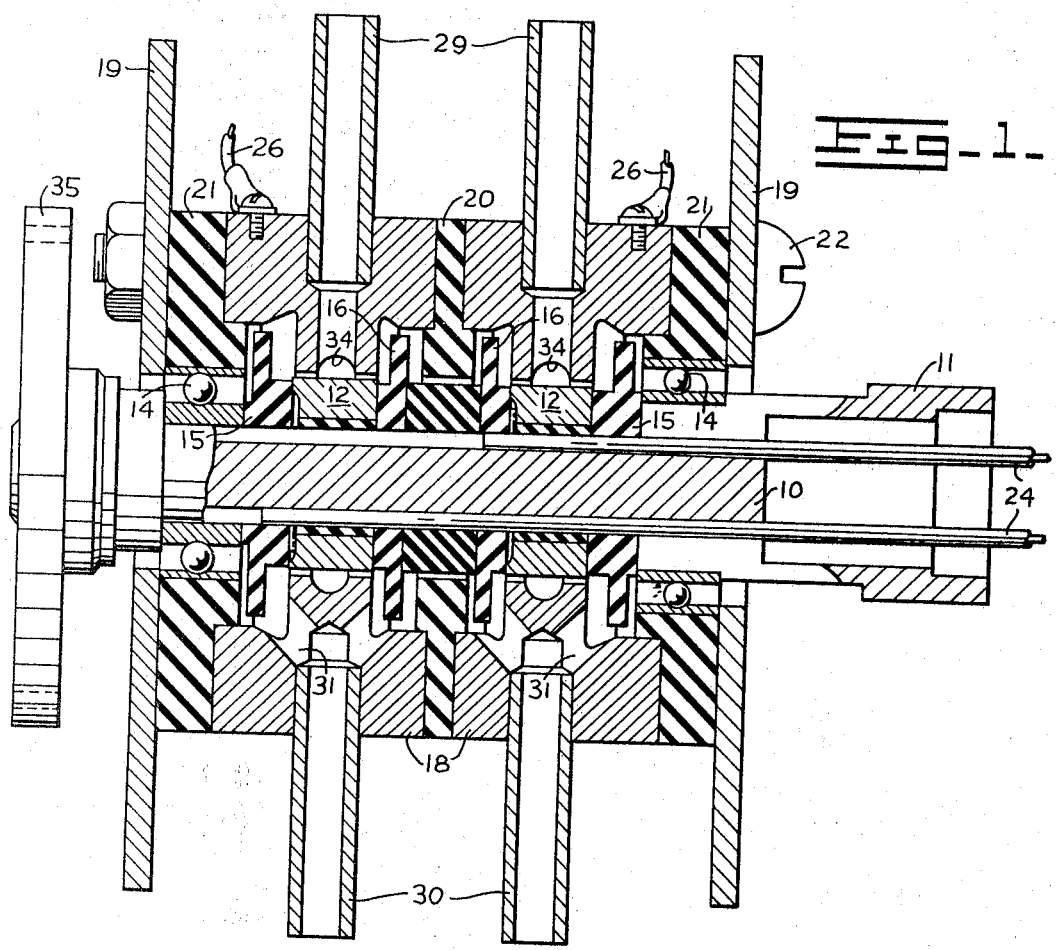
Figure 3:
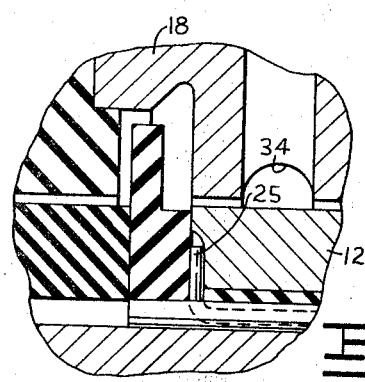
Figure 2:
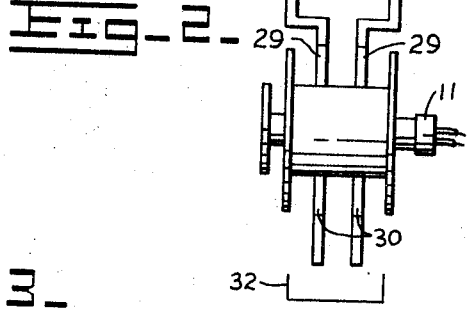

In the drawing:
FIG. 1 is a central longitudinal sectional view taken through a slip ring embodying the present invention;
FIG. 2 is a schematic illustration of the slip ring illustrating the means for circulating mercury therethrough during its operation; and
FIG. 3 is an enlarged fragmentary view of an electrical connection which is shown in FIG. 1.

The slip ring of the present invention is made for two electrical channels but is readily adaptable to manufacture with a greater number of channels as will be apparent from the ensuing description. A shaft shown at 10 in FIG. 1 has an adapter 11 at one end by means of which the shaft may be secured to a rotating part to be analyzed with the use of strain gauges. Two rotors 12 are secured to and suitably insulated from the shaft and are separated from each other and from bearings 14 which support the shaft for rotation by spacers such as shown at 15 and 16 which also serve as mercury slingers as will presently be described in detail. A pair of stators 18 surround the rotors 12 in spaced relation thereto and are spaced from each other and from end plates 19 by suitable insulating spacers such as shown at 20 and 21. Bolts, one of which is shown at 22, hold the assembled stators and spacers as well as the end plates 19 in their assembled relationship.

Two insulated electrical conductors shown at 24 are used to form a communication between a sensor on a rotating part and the rotors 12 on the shaft 10 as it rotates with the part. The conductors pass through grooves or channels formed in the periphery of the shaft and each has an end 25, as best shown in FIG. 3, bent away from the shaft and into a small groove in the end of one of the rotors into which it is tightly fitted to form a good electrical contact. Wires 26, secured one to each of the stators 18, communicate with suitable recording equipment (not shown) and an electrical contact between the stators and rotors is accomplished with mercury occupying the space between these parts.

According to the present invention the mercury is fed from containers, such as indicated at 28 in FIG. 2, through tubes 29 and suitable passages to the inner peripheries of the stators. Similar tubes 30 communicate through passages 31 with the lower portion of the stators for draining the mercury into a container, represented at 32 in FIG. 2. Consequently, mercury is continuously passed through the slip ring assembly during its operation so that it serves as a cooling agent for parts heated by the friction of high-speed operation and also may be cleaned as by distillation each time that it is used to prevent any accumulation of contaminants.

The quantity of mercury flowing through the device may be varied by the varying height of the containers 28 and the quantity is so regulated that a small annular chamber formed by a groove 34 on the inner surface of each stator is substantially filled. Excess mercury flows laterally outwardly and the spacers 15 and 16 act as slingers causing it to flow radially outwardly and through the passages 31. This prevents mercury from passing from the chamber of one rotor into the chamber of the next.

A perforated iron disc shown at 35 may be attached to the end of the shaft for cooperation with a magnetic pick up device (not shown) for registering the speed of rotation of the shaft. While copper is a metal commonly used for mercury-type slip rings, the slip ring of the present invention is manufactured in very small sizes and with close tolerances so that difficulty has been encountered because of amalgamation between the mercury and copper rotors and stators. Consequently, the rotors and stators are preferably made of rhodium-plated nickel. Stainless steel is employed for the inlet tubes 29 but, since stainless steel is not easily wetted by mercury, flow through the lower tubes 30 was found imperfect and copper tubes are now used to insure free flow through these tubes and to the container 32. Overheating of this small device which was previously a problem has been overcome by using the mercury as a coolant as well as a conductor. Contamination of the mercury also is avoided by the continuous flow of clean mercury through the device.

We claim:
1. A slip ring comprising a rotor of electrical conducting material secured to a shaft, a stator of electrical conducting material closely spaced with respect to the rotor, an enclosure surrounding the rotor and stator, means to circulate mercury through said enclosure to substantially fill the space between the rotor and stator and to create a path for the flow of electrical current between the rotor and stator, and disc-shaped slinger means mounted on said shaft at opposite sides of said rotor to cause excess mercury to flow radially outwardly and through drain means.

2. The combination of claim 1 in which there are more than one rotor and stator, and in which the rotors are mounted on a common shaft which may be attached to a rotatable device with electrical testing mechanisms thereon.

3. The combination of claim 2 in which the shaft is horizontally disposed and mercury flows by gravity into the tops of the enclosures, and drain means at the bottoms of the enclosures.

References Cited by the Examiner

UNITED STATES PATENTS

| | | | |
|---|---|---|---|
| 1,960,621 | 5/1934 | Duplessis | 240—1.1 |
| 2,205,688 | 6/1940 | Elwell | 310—228 |
| 2,698,405 | 12/1954 | True et al. | 339—8 X |
| 2,915,731 | 12/1959 | Bradley et al. | 339—5 |
| 3,078,432 | 2/1963 | Kenyon | 339—8 |
| 3,218,595 | 11/1965 | Motsinger | 339—5 |

FOREIGN PATENTS 183,836   9/1923   Great Britain.

MARVIN A. CHAMPION, *Primary Examiner.*

ALFRED S. TRASK, *Examiner.*

P. TEITELBAUM, *Assistant Examiner.*